Patented Aug. 21, 1928.

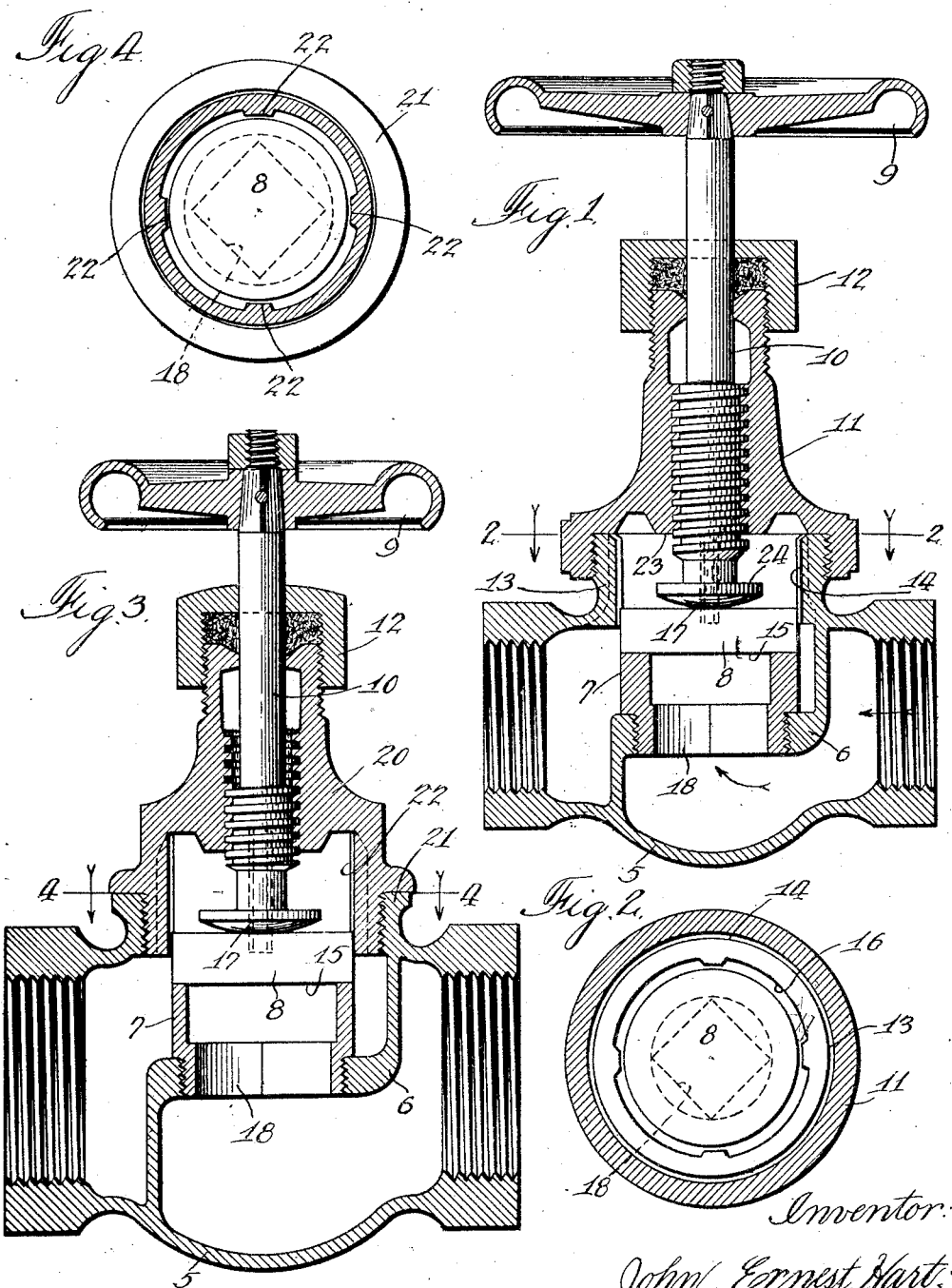

1,681,233

UNITED STATES PATENT OFFICE.

JOHN ERNEST HART, OF WILLIAMSPORT, PENNSYLVANIA.

VALVE.

Application filed March 21, 1927. Serial No. 176,906.

This invention relates to valves and more particularly to globe valves either straight, angle or Y, but the invention is applicable to other types of valves, faucets, and the like. One of the objects of the invention is to provide a floating valve disk which is properly guided as it opens and closes but is free to open and close under the pressures that may be acting upon it. Another object of the invention is to provide a suitable valve seat for coaction with the valve disk. Other objects of the invention will be apparent from a consideration of the accompanying drawings and the following description thereof.

Of the drawings Fig. 1 is a vertical sectional view of a valve which embodies the features of my invention; Fig. 2 is a transverse section along the line 2—2 of Fig. 1; Fig. 3 is a vertical central sectional view of a modified form of valve and Fig. 4 is a transverse sectional view along the line 4—4 of Fig. 3.

The preferred form of valve which I illustrate and describe as embodying my invention comprises a casing 5 which has a web 6 therein, and a valve seat 7, a valve disk 8 for coacting with the seat, a handle 9 for operating the valve stem 10, a bonnet 11 into which the stem is threaded, and a stuffing nut 12.

Projecting from the body of the casing 5 is an annular flange 13 on which is threaded the bonnet 11, and within this flange, integral therewith or fixed thereto in any suitable manner, are guides 14 which are adapted to guide the disk 8 as it rises and sinks in operation. As will be understood, when the fluid under pressure is entering in the direction indicated by the arrows, and the stem is unscrewed the valve disk 8 will rise, held in vertical position by the guides 14, and the fluid will pass through the port 15 of the valve seat and through the valve casing. This flow of the fluid is assisted by providing the spaces 16 between the guides 14. Moreover, when back pressure is produced in any way the fluid will pass through these spaces 16 above the disk and close it on the seat.

By this arrangement, the valve disk may be readily removed from the valve by unscrewing the bonnet, and in order to assist in removing the disk I provide the disk with a diameter somewhat less than the distance from one guide 14 to the opposite guide; so that, in case the valve is fixed in a pipe line with the seat horizontal, a thin implement can be passed down into one of the spaces 16 and the disk be elevated or turned on edge and removed. The disk may then be readily machined, or it may be turned over, if desired, so as to present a new side to the valve seat.

I prefer to have the lower end 17 of the valve stem rounded, as indicated, so that at all times the pressure of the valve stem is on one point of the disk, thus allowing the disk to adapt itself properly to the valve seat; but flat or even concave ends may be used. In order that the stem may be repacked without leakage when the valve is open, I provide an annular seat 23 on the under side of the bonnet on which the annular flange 24 on the end of the valve stem may seat, when the stem is screwed upward sufficiently.

The valve seat 7 may be made integral with the web, but in order that it may be removed for machining, renewing, or for other purposes, I prefer to thread it into the web; and for the purpose of assisting in unscrewing the seat I provide a portion 18 of the port square shaped or non-circular, so that a tool may be entered in the opening to unscrew the seat.

Fig. 3 shows a modification of the valve in which the bonnet 20 is screwed into the annular flange 21 instead of outside of the flange. In this instance the guides 22 are fixed to the inner wall of the bonnet instead of to the flange. In this modification when the disk is to be removed or turned it is necessary only to unscrew the bonnet from the body of the valve when the disk 8 may be readily removed.

I claim as my invention:—

1. A valve having a casing, a valve seat, a valve disk loosely mounted on said seat, vertical valve disk guides extending away from said seat and at right angles to its plane and means for pressing said disk against said seat, said guides being spaced above said seat a distance somewhat less than the thickness of said disk.

2. A valve having a casing, a valve seat, a valve disk loosely mounted on said seat, vertical valve disk guides extending away from said seat and at right angles to its plane and means for pressing said disk against said seat, said casing having an annular flange spaced above said seat and said guides being fixed to the inner wall of said flange.

3. A valve having a casing, a valve seat, a valve disk loosely mounted on said seat, vertical valve disk guides extending away from said seat and at right angles to its plane and means for pressing said disk against said seat, said casing having an annular flange spaced above said seat, and said guides being fixed to the inner wall of said flange and projecting inwardly a material distance from said wall, the inner surfaces of said guides all lying in the same imaginary cylinder.

4. A valve having a casing, a valve seat, a valve disk loosely mounted on said seat, vertical valve disk guides extending away from said seat and at right angles to its plane and means for pressing said disk against said seat, said casing having an annular flange spaced above said seat, said guides being fixed to the inner wall of said flange and projecting inwardly a material distance from said wall, the inner surfaces of said guides all lying in the same imaginary cylinder, and the diameter of the cylinder being greater than the diameter of the valve disk.

In testimony whereof, I hereunto set my hand.

JOHN ERNEST HART.